July 10, 1956 E. G. ZENK 2,753,785
LAWN EDGE TRIMMER
Filed Sept. 14, 1954
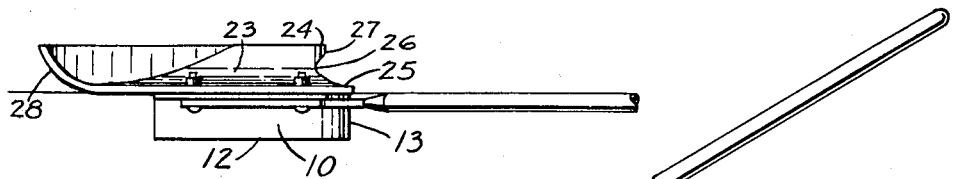
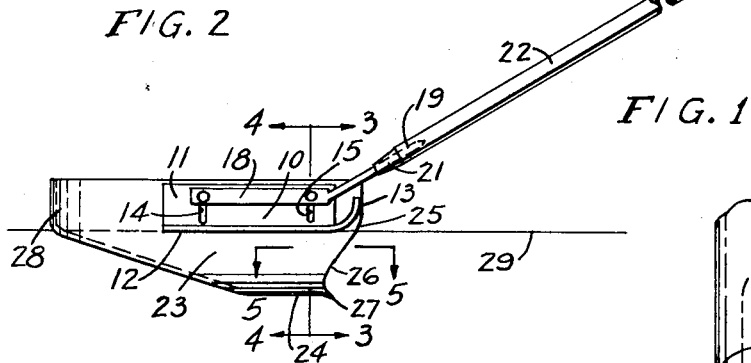
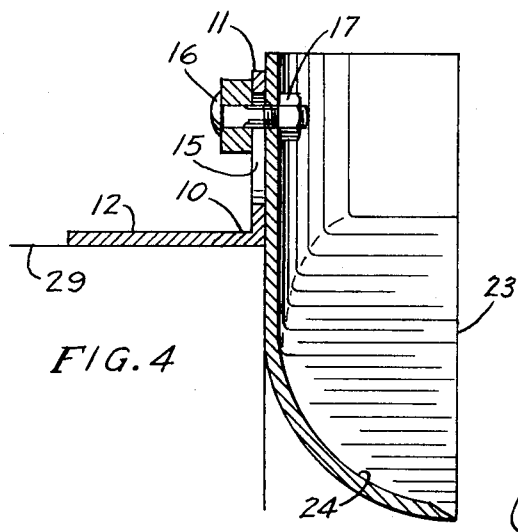
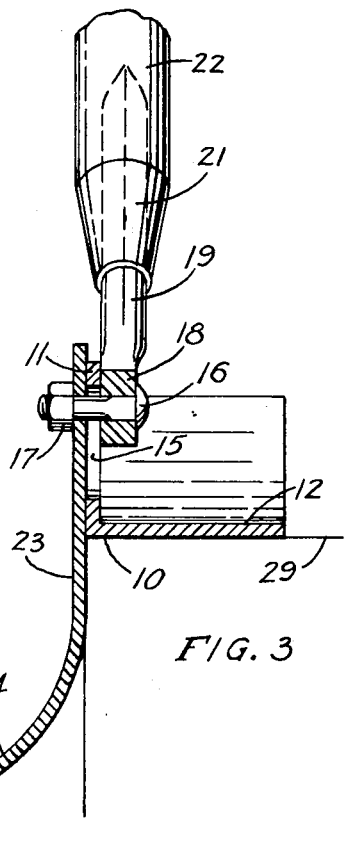
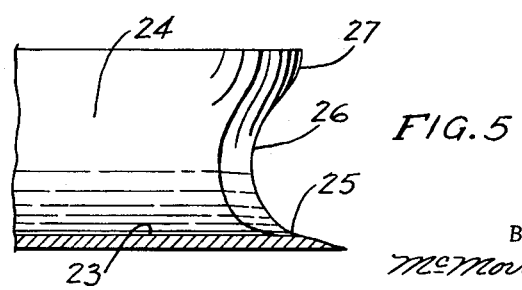
ERNEST G. ZENK
INVENTOR
BY
McMorrow, Berman & Davidson
ATTORNEYS

_2,753,785_

LAWN EDGE TRIMMER

Ernest G. Zenk, Sheboygan, Wis.

Application September 14, 1954, Serial No. 456,012

2 Claims. (Cl. 97—227)

The present invention relates to improvements in devices for trimming the edge of a lawn and one that is particularly adapted for trimming the edge of the lawn along the side of a curb or sidewalk.

The principal object of the present invention is to provide a device of sturdy but simple construction for trimming the edge of a lawn adjacent to a sidewalk, curb or other solid surface.

Another object of the present invention is to provide a lawn edge trimmer that is adjustable to raise or lower the cutting member so that a uniform appearance may be obtained if the sidewalk top surface varies in height over the top surface of the lawn immediately adjacent.

A further object of the present invention is to provide a lawn edge trimmer that may be either pushed or pulled along the edge of a lawn and one which casts the cut sod and dirt outwardly from the lawn.

These and other objects and advantages of the present invention will be apparent from the following description when considered in connection with annexed drawings, in which:

Figure 1 is a side view in elevation of the present invention,

Figure 2 is a top plan view,

Figure 3 is a view partly in cross section on line 3—3 of Figure 1,

Figure 4 is a view in cross section on line 4—4 of Figure 1, and

Figure 5 is a vertical view on line 5—5 of Figure 1.

Referring in greater detail to the drawing, in which like reference numerals indicate like parts throughout the several views, the present invention is seen to consist of: an L-shaped guide member 10, made of angle iron or the like, and having one leg 11 extending vertically and the other leg 12 horizontally. The forward end 13 of the leg 12 is upturned and the vertical leg 11 has a pair of slots 14 and 15, through which extend the bolts 16. Nuts 17 are on the bolts 16 to hold the assembly together. A square bar 18 having one end 19 extending upwardly at an angle is secured in the ferrule 21 and hole in the end of the handle 22.

A cutting member 23 has a vertically extending upper portion provided with bolt holes for the bolts 16 and is arcuately curving along its longitudinal axis at its lower end 24. Its forward end 25 is formed with a rearwardly curving cutting edge 26 terminating in a forwardly projecting point 27 at its lower end.

The cutting member 23 is also arcuately curved transversely to the longitudinal axis at its other end 28 remote from the cutting edge, and both curves are in the direction away from or opposite to the horizontally extending leg 12 of the guide member.

The bottom of the cutting member at its rearward end 28 therefore slopes upwardly and in use, scoops the cut sod and dirt from the space immediately adjacent the sidewalk and deposits this dirt on the sidewalk.

The handle 22 may be reversed for pushing although as seen in Figure 2, it is arranged for pulling and is most generally so used. It will be readily understood that the bolts 16 may be moved in the slots 14 and 15 to adjust the height of the cutting member 23 relative to the horizontal leg 12 which engages the top surface of the lawn, indicated at 29. The point 27 of the cutting member, with the rearwardly curving cutting edge is very effective for severing grass roots and keeps the tool in the soil.

In use, the trimmer is pushed or pulled with the leg 12 on the lawn beside the edge of the sidewalk and the sod and dirt is removed from the space immediately beside the sidewalk, the cut sod and loosened dirt piling on the sidewalk for easy removal.

In the preferred embodiment, the point 27 of the cutting member is best positioned immediately to the rear of the forward end of the guide member.

While a single embodiment has been described and illustrated other embodiments are contemplated and many changes and modifications may be made within the scope of the appended claims without departing from the spirit of the invention.

What is claimed is:

1. A lawn edge trimmer comprising an L-shaped guide member having one leg vertically extending and the other leg disposed horizontally, said guide member being adapted and arranged to engage on said other leg the surface of a lawn on the edge thereof, a cutting member adjustably secured by its upper end to said guide member on said vertically extending one leg and being disposed thereon opposite said surface engaging leg, said cutting member having on its leading end a rearwardly curving cutting edge terminating at its lower end in a forwardly projecting point, said cutting member also having the upper portion extending vertically with its lower end arcuately curved along its longitudinal axis in the direction opposite to said guide member, and reversible means to operate said trimmer with said guide member engaging the top surface of a lawn on the edge thereof.

2. A lawn edge trimmer comprising an L-shaped guide member having one leg vertically extending and the other leg disposed horizontally and formed with an upturned forward end, said guide member being adapted and arranged to engage on said other leg the surface of a lawn on the edge thereof, a cutting member adjustably secured by its upper end to said guide member on said vertically extending one leg and being disposed thereon opposite said surface engaging leg, said cutting member having on its forward end a rearwardly curving cutting edge terminating at its lower end in a forwardly projecting point and being disposed relative to said guide member with said point immediately to the rear of said forward end of said guide member, said cutting member also having the upper portion extending vertically with its lower end arcuately curved along its longitudinal axis in the direction opposite to said guide member, and its end remote from said cutting edge arcuately curved transversely to its longitudinal axis in the direction opposite to said guide member, and reversible means to operate said trimmer with said guide member engaging the top surface of a lawn on the edge thereof.

References Cited in the file of this patent

UNITED STATES PATENTS

| | | |
|---|---|---|
| 1,082,570 | Underwood | Dec. 30, 1913 |
| 2,000,460 | Apfel et al. | May 7, 1935 |
| 2,041,179 | Highee | May 19, 1936 |
| 2,052,154 | Wingard | Aug. 25, 1936 |
| 2,288,374 | Steele | June 30, 1942 |